United States Patent
Inoue

(10) Patent No.: US 8,224,639 B2
(45) Date of Patent: Jul. 17, 2012

(54) METHODS AND APPARATUS FOR ACHIEVING THERMAL MANAGEMENT USING PROCESSING TASK SCHEDULING

(75) Inventor: Keisuke Inoue, Austin, TX (US)

(73) Assignee: Sony Computer Entertainment Inc. (JP)

( * ) Notice: Subject to any disclaimer, the term of this patent is extended or adjusted under 35 U.S.C. 154(b) by 1802 days.

(21) Appl. No.: 10/812,177

(22) Filed: Mar. 29, 2004

(65) Prior Publication Data

US 2005/0216222 A1 Sep. 29, 2005

(51) Int. Cl.
*G06G 7/54* (2006.01)
(52) U.S. Cl. ........................................................ 703/18
(58) Field of Classification Search .................... 713/322
See application file for complete search history.

(56) References Cited

U.S. PATENT DOCUMENTS

| | | |
|---|---|---|
| 5,274,797 A | 12/1993 | Barlow et al. |
| 5,357,632 A | 10/1994 | Pian et al. |
| 5,710,935 A | 1/1998 | Barker et al. |
| 5,715,184 A | 2/1998 | Tyler et al. |
| 5,740,409 A | 4/1998 | Deering |
| 5,745,778 A | 4/1998 | Alfieri |
| 5,754,436 A | 5/1998 | Walsh et al. |
| 5,761,516 A | 6/1998 | Rostoker et al. |
| 5,815,403 A | 9/1998 | Jones et al. |
| 5,828,568 A | 10/1998 | Sunakawa et al. |
| 6,002,409 A | 12/1999 | Harkin |
| 6,192,479 B1 | 2/2001 | Ko |
| 6,269,043 B1 | 7/2001 | Batcher |
| 6,564,328 B1 | 5/2003 | Grochowski et al. |
| 6,633,563 B1 | 10/2003 | Lin et al. |
| 6,753,878 B1 | 6/2004 | Heirich et al. |
| 6,775,787 B2 | 8/2004 | Greene |
| 6,859,882 B2 | 2/2005 | Fung |
| 6,901,522 B2 | 5/2005 | Buch |
| 6,948,082 B2 | 9/2005 | Gschwind et al. |
| 6,976,178 B1 | 12/2005 | Kissell et al. |
| 7,032,099 B1 | 4/2006 | Imamura |
| 7,043,648 B2 | 5/2006 | Tokunaga et al. |
| 7,096,145 B2 | 8/2006 | Orenstien et al. |
| 7,254,812 B1 | 8/2007 | Menezes |
| 2002/0053684 A1 | 5/2002 | Chauvel et al. |
| 2002/0065049 A1* | 5/2002 | Chauvel et al. .............. 455/66 |

(Continued)

FOREIGN PATENT DOCUMENTS

EP 1096360 5/2001

(Continued)

OTHER PUBLICATIONS

Azevedo et al., "Architectural and Complier Strategies for Dynamic Power Management in the COPPER Project," 2001 International Workshop on Innovative Architecture, Jan. 2001.

(Continued)

*Primary Examiner* — Saif Alhija
(74) *Attorney, Agent, or Firm* — Lerner, David, Littenberg, Krumholz & Mentlik, LLP

(57) ABSTRACT

The present invention provides apparatus and methods to perform thermal management in a computing environment. In one embodiment, thermal attributes are associated with operations and/or processing components, and the operations are scheduled for processing by the components so that a thermal threshold is not exceeded. In another embodiment, hot and cool queues are provided for selected operations, and the processing components can select operations from the appropriate queue so that the thermal threshold is not exceeded.

9 Claims, 12 Drawing Sheets

U.S. PATENT DOCUMENTS

| | | | |
|---|---|---|---|
| 2002/0116654 | A1 | 8/2002 | Rosch et al. |
| 2002/0138616 | A1 | 9/2002 | Basson et al. |
| 2002/0138676 | A1 | 9/2002 | Kendall et al. |
| 2003/0069985 | A1 | 4/2003 | Perez |
| 2003/0079151 | A1 | 4/2003 | Bohrer et al. |
| 2003/0110012 | A1 | 6/2003 | Orenstien et al. |
| 2003/0115495 | A1 | 6/2003 | Rawson, III |
| 2003/0125900 | A1 | 7/2003 | Orenstien et al. |
| 2003/0229662 | A1 | 12/2003 | Luick |
| 2004/0003309 | A1 | 1/2004 | Cai et al. |
| 2005/0278520 | A1 | 12/2005 | Hirai et al. |

FOREIGN PATENT DOCUMENTS

| | | |
|---|---|---|
| EP | 1 182 552 A2 | 2/2002 |
| JP | 05-257907 | 10/1993 |
| JP | 08-016531 A | 1/1996 |
| JP | 10-240704 A | 9/1998 |
| JP | 11-202988 | 7/1999 |
| JP | 2001-125875 | 5/2001 |
| JP | 2001-222517 | 8/2001 |
| JP | 2002-064145 | 2/2002 |
| JP | 2002-202893 | 7/2002 |
| JP | 2003-256067 | 9/2003 |
| WO | WO-03/025745 A2 | 3/2003 |
| WO | WO-03/083693 A | 10/2003 |

OTHER PUBLICATIONS

Heo et al., "Reducing Power Density through Activity Migration," Proceedings of the 2003 International Symposium on Low Power Electronics and Design (ACM Press, © 2003), pp. 217-222.

Tiwari et al., "Instruction Level Power Analysis and Optimization of Software," Journal of VLSI Signal Processing, vol. 13, No. 2 (Aug. 1996), pp. 1-18.

Abhishek Mehta, "Techniques for Low Power Processing—A Survey" CSE 822, Spring 2001, A29838087, Retrieved from the Internet on Mar. 29, 2004, <URL: www.cs.vcr.edu/~chzhang/papers_read/lowpower_survey.pdf>; 10 pages.

Lee et al., "Power Analysis and Minimization Techniques for Embedded DSP Software," IEEE Transactions on VLSI Systems, vol. 5, No. 1, Mar. 1997, pp. 123-135.

Gerosa et al., "A 250-MHz 5-W PowerPC Microprocessor with On-Chip L2 Cache Controller," IEEE Journal of Solid-State Circuits, vol. 32, No. 11, Nov. 1997, pp. 1635-1649.

Skadron et al., "Temperature-Aware Microarchitecture: Modeling and Implementation," ACM trans. on architecture and code optimization, pp. 94-125, Mar. 2004.

Pinheiro, Eduardo, et al., "Load Balancing and Unbalancing for Power and Performance in Cluster-Based Systems," 10th International Conference on Parallel Architectures and Compilation Techniques, May 2001.

Elnozahy, E.N., et al., "Energy-Efficient Server Clusters," Proceedings of the Workshop on Power-Aware Computing Systems, Feb. 2, 2002.

Seongmoo Heo et al, "Reducing Power Density Through Activity Migration", Proceedings of the 2003 International Symposium on Low Power Electronics and Design, Seoul, Korea, Aug. 25-27, 2003.

Office Action dated Sep. 28, 2007 from corresponding Chinese Patent Application No. 200580010385.9 with English Translation, 20 pages.

Anoop Iyer, Diana Marculescu: "Power Aware Microarchitecture Resource Scaling" Design, Automation and Test in Europe, Conference and Exhibition Mar. 13, 2001, pp. 190-196 (7 pages).

Taku, Yasui "Linux Kernel for beginners, Part 3, Processing scheduling", Nikkei Linux, Nikkei BP, Nov. 8, 2003, vol. 5, No. 11, pp. 97-103 (CS-ND-2004-01116-007).

Office Action from Japanese Application 2003-335660 dated Jan. 5, 2010.

* cited by examiner

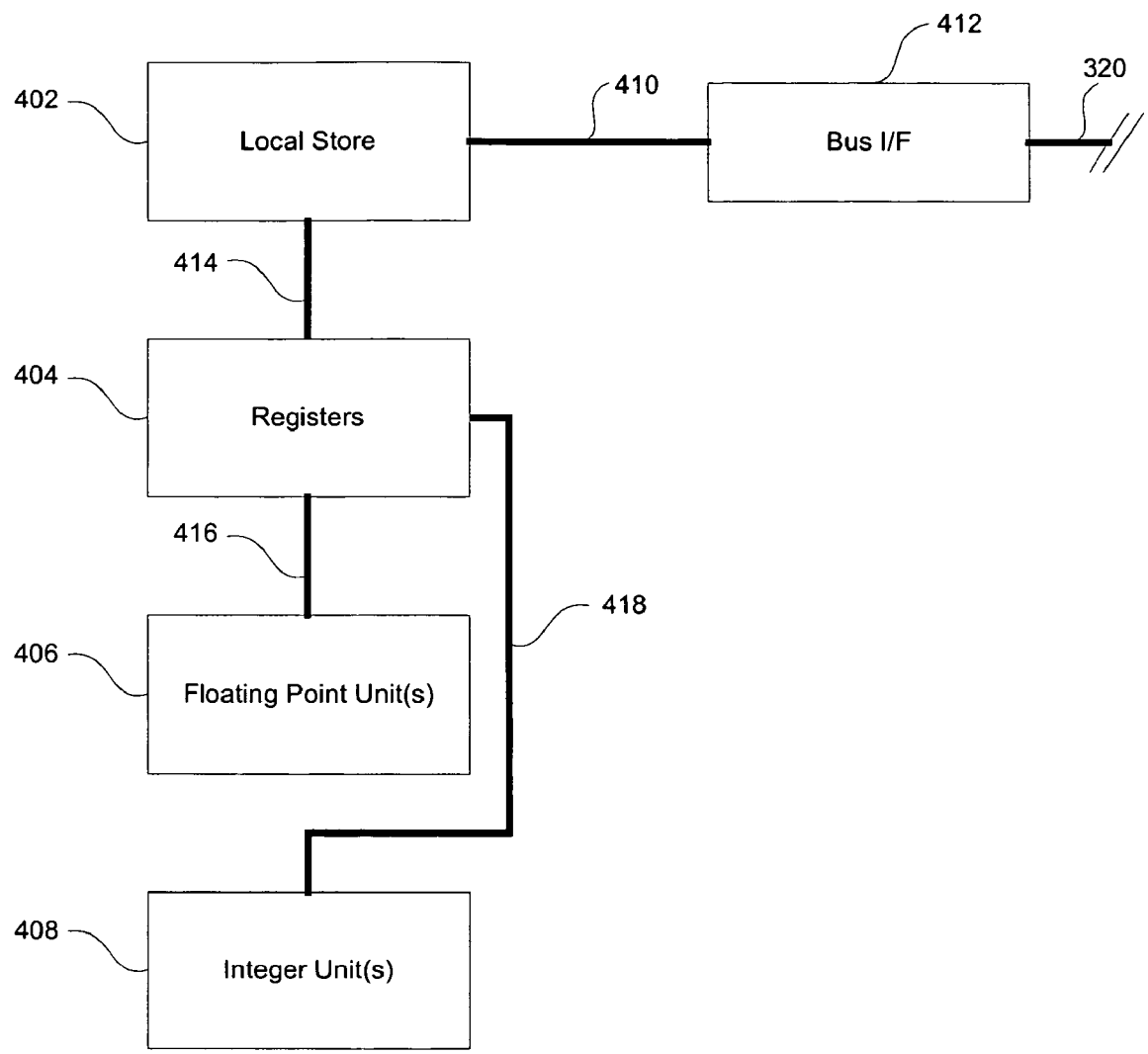

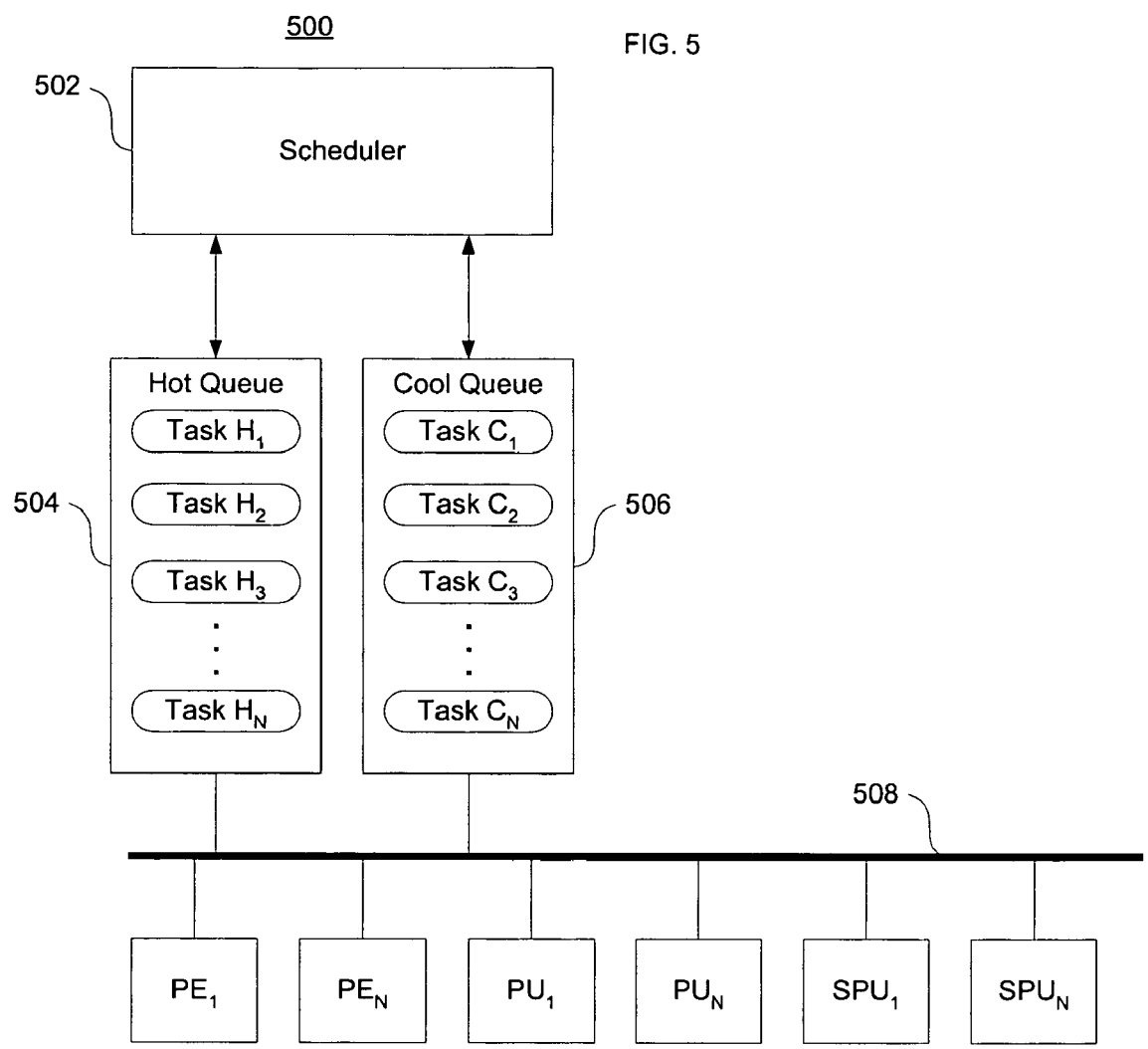

METHODS AND APPARATUS FOR ACHIEVING THERMAL MANAGEMENT USING PROCESSING TASK SCHEDULING

CROSS-REFERENCE TO RELATED APPLICATIONS

This application is related to commonly assigned U.S. patent application Ser. No. 10/812,115, entitled "Methods and Apparatus for Achieving Thermal Management Using Processor Manipulation," filed Mar. 29, 2004, and incorporated by reference herein.

BACKGROUND OF THE INVENTION

The present invention relates to methods and apparatus for performing thermal management in a processing environment, and, in particular, for reducing thermal hot spots by effectively allocating instructions and tasks.

Computing systems are becoming increasingly more complex, achieving higher processing speeds while at the same time shrinking component size and densely packing devices on a computer chip. Such advances are critical to the success of many applications, such as real-time, multimedia gaming and other computation-intensive applications. Often, computing systems incorporate multiple processors that operate in parallel (or at least in concert) to increase processing efficiency.

Heat is often generated as components and devices perform operations such as instructions and tasks. Excessive heat can adversely impact the processing capability of an electronic component such as a computer chip. For example, if one area of the chip is performing computationally intensive tasks, that area can heat up significantly and form a hot spot relative to the rest of the chip. If the hot spot exceeds a thermal threshold, the performance of the components or devices in that area of the chip may be degraded, or the chip may even become damaged or destroyed.

In the past, a variety of solutions have been employed to solve the overheating problem. A mechanical solution is to attach a heat sink to the computer chip. However, heat sinks are bulky and may merely serve to expel heat from the chip and into the volume of space surrounding the chip. When the chip is stored in an enclosure, such as personal computer cabinet, this heat must be removed such as by the use of fans, which themselves take up space and generate unwanted noise.

Other, more complex heat management schemes also exist. For instance, in one solution, temperature sensors can be placed on critical circuit elements, such as the processor, and fans can be mounted in an associated system enclosure. When the temperature sensors indicate a particular temperature has been reached, the fans turn on, increasing the airflow through the system enclosure for cooling down the processor. Alternatively, an alarm could be generated which causes the processing environment to begin a shutdown when the temperature sensors indicate that a predefined temperature level has been exceeded. The sensors are often placed at a distance from a hot spot. Unfortunately, this feedback approach may function too slowly or unreliably to prevent overheating.

Further attempts to perform heat management employ the use of software. For example, one technique slows down a component's clock so that has more time to cool down between operations. One conventional system controls the instruction fetch rate from the instruction cache to the instruction buffer using a throttling mechanism. Reducing the fetch rate lowers the generation of heat. An even more drastic approach is to shut down the processor and allow it to cool down. Unfortunately, all of these techniques directly impact the speed at which the component operates, and can be detrimental to real-time processing needs.

Therefore, there is a need in the art for new methods and apparatus for achieving thermal management while avoiding additional hardware or inefficient software routines.

SUMMARY OF THE INVENTION

In accordance with aspects of the present invention, thermal scheduling methods are provided. In a preferred embodiment, a component has a thermal threshold, and the method includes providing a plurality of operations to be performed by the component. Thermal information associating the operations with a thermal attribute is provided. The thermal attribute represents a value related to the amount of heat expected to be generated or incurred by the component during performance of the operation. The order in which the operations are to be performed is scheduled based on the thermal attribute so that the thermal threshold is not exceeded.

In one example, the method further comprises measuring the thermal attribute with a temperature sensing means. In another example, the method further comprises estimating the thermal attribute based on power consumption of the component. The thermal attribute may be estimated in different ways. In one case, estimation includes performing a circuit simulation of the component. In another case, estimation includes determining a power density of the component.

In yet another example, the method further comprises having the component execute the operations in the order of performance. More preferably, the component includes a plurality of processing devices, and the thermal attribute is an aggregate thermal attribute of selected processing devices that execute the operations.

In a further example, the component includes a plurality of processing devices, each of the processing devices has an individual thermal threshold, and the thermal attribute includes a plurality of individual thermal attributes each associated with one of the processing devices. In this case, the method preferably includes selecting at least some of the processing devices to execute the operations. The selected devices are monitored, and the operations are routed among the selected devices so that the individual thermal thresholds are not exceeded. In an alternative example, the component includes a plurality of processing devices, and the thermal attribute is allocated among the plurality of processing devices.

In yet another example, the step of determining the thermal attribute may include (i) determining the power consumption of the component; (ii) determining the footprint (size) of the component; (iii) dividing the power consumption by the footprint to obtain per-area power consumption; and (iv) multiplying this by a thermal estimation constant. In another example, the method may further include determining a cooling attribute so that the cooling attribute is incorporated into scheduling the operations along with the thermal attribute.

In another preferred embodiment, a method first obtains program code having a series of operations, and determines thermal attributes associated with one or more of the operations. The thermal threshold of a component is also determined. The operations are scheduled for execution by the component in accordance with the thermal attributes so that the thermal threshold is not exceeded.

In an example, the thermal attributes account for an amount of heat expected to be generated as the component executes a selected operation. In another example, the thermal attributes account for an amount of heat generated over a period of time. In a further example, the thermal attributes account for at least one of (a) power consumption of the component, and (b) power density of the component.

In yet another example, the method further comprises having the component execute the operations. The temperature of the component is monitored during execution. The operations are rescheduled if the thermal threshold is exceeded.

In another example, the method further comprises estimating the thermal attributes by counting the number of tasks to be performed in each of the operations.

In a further example, the component includes a plurality of processing devices. In this case, the method preferably includes monitoring a dynamic execution of selected operations by selected processing devices. The operational frequency of the selected devices is determined. The operational frequency is reported to a compiler.

In yet another example, the method further comprises determining a cooling attribute for a computing device. The computing device includes the component. The step of scheduling the operations is performed in accordance with the cooling attribute and the thermal attribute. The cooling attribute may be based on the type of packaging of the computing device. It may also be based on a cooling means of the computing device. In this case, if the cooling means has one state, the cooling attribute is fixed. If the cooling means has multiple states, the cooling attribute is dynamic.

In accordance with other aspects of the present invention, processing systems and methods are provided for handling operations in a computing environment. In one embodiment of a processing system, operations are performed by a component, which is part of a computing device. At least one thermal attribute is provided. The attribute is associated with the component and a selected operation. It is indicative of the change in temperature of the component after performing the operation.

In one example, the processing system includes a scheduler. The scheduler is capable of assigning at least one of the operations to the component depending upon the thermal attribute. In one case, the scheduler is operable to retrieve a chosen operation from a storage location depending upon the thermal attribute. In another case, the component includes sub-components, the scheduler is a simple scheduler, and the thermal attribute is a total thermal attribute associated with the component and not associated with the sub-components. In yet another case, the component includes sub-components, the scheduler is an advanced scheduler, and the thermal attribute is further associated with at least some of the sub-components.

In another example, the component is a processing device and the scheduler is integrated with the processing device. In a further example, the selected operation comprises a task and the thermal attribute is a task thermal attribute. In this case, the task thermal attribute is preferably based on at least one of (a) an operating frequency of the component, (b) a thermal attribute of the component, and (c) a cooling attribute.

In yet another example, at least some of the operations include a priority. In this case, the system further comprises a plurality of priority queues, wherein each priority queue includes a first (e.g., hot) queue for storing a first set of operations and a second (e.g., cool) queue for storing a second set of operations. Preferably, the system further includes a scheduler. The scheduler is operable to assign at least some of the operations to either the hot or the cool queue in a selected priority queue based on the priorities of the operations, and on the thermal attribute. More preferably, the scheduler is further operable to retrieve a chosen one of the operations from the hot queue or the cool queue of the selected priority queue depending upon the thermal attribute and the priority of the chosen operation.

In another embodiment of a processing system in accordance with aspects of the present invention, a scheduler, first and second operations, and a plurality of processors are provided. The scheduler manages operations which comprise the first and second operations. The first operation has a thermal attribute exceeding an operating threshold. The second operation has a thermal attribute which does not exceed the operating threshold. The processors are capable of executing the operations. Each processor has a thermal threshold.

In one example, if the thermal threshold of a selected processor is not exceeded, that processor can obtain and execute at least one of the first second operations. In another example, if the thermal threshold of the selected processor is not exceeded, the processor obtains the first operation. In a further example, if the thermal threshold of the selected processor is exceeded, the processor is operable to obtain and execute the second operation.

In yet another example, the processors include temperature sensing means for monitoring or estimating the temperatures of the processors. Preferably, the processors further include an analog to digital converter, which is operable to receive a temperature value from the temperature sensing means and to provide a digital temperature value.

In another example, a selected processor includes a plurality of sub-processors. Desirably, the selected processor has a total thermal attribute associated with the selected processor and not associated with the sub-processors. Alternatively, each sub-processor desirably has a component thermal attribute distinct from he component thermal attributes of the other sub-processors.

In accordance with aspects of the present invention, a preferred method of performing operations in a computing environment is provided. The method includes storing a first operation and storing a second operation. The operations are stored based upon thermal attributes of the operations. The method further includes retrieving at least one of the operations depending upon a thermal threshold of a processor.

Preferably, if the thermal threshold of the processor is not exceeded, at least one of the operations can be retrieved. More preferably, only the first operation is retrieved. If the thermal threshold of the processor is exceeded, the second operation is preferably retrieved.

The method preferably includes the additional steps of determining priorities of the first and second operations and providing a plurality of priority queues. In this case, priority queues are provided having first and second queues therein. The first operation is stored in one of the first queues based on the priority of the first operation, and the second operation is stored in one of the second queues based on the priority of the second operation.

In another example, the method further comprises associating a component thermal attribute with the processor. In this case, retrieving the operation includes evaluating a current state of the component thermal attribute and selecting the operation based on the component thermal attribute.

In accordance with aspects of the present invention, another preferred method of performing operations includes determining if the temperature of a processor exceeds a thermal threshold. If it is not exceeded, the method determines whether a first operation is available. The first operation is likely to maintain or increase the temperature of the processor upon execution. If the first operation is available, it is executed. If the thermal threshold is exceeded, the method determines whether a second operation is available. The second operation is likely to decrease the temperature of the processor upon execution. If the second operation is available, it is executed.

In an example, if the cool queue operation is not available, the method preferably performs a "no operation" or "nop." In another example, the method further comprises determining a priority level, determining if the first operation is available from a priority queue of the priority level, and, if the first operation is not available from the priority queue, determining if the second operation is available from the priority queue.

In another embodiment according to further aspects of the present invention, a processing apparatus is provided. The processing apparatus is capable of processing operations associated with thermal attributes. The processing apparatus comprises a memory and a plurality of processing devices. The memory is for storing first and second operations. The first operation has a thermal attribute that exceeds an operating threshold. The second operation has a thermal attribute that does not exceed the operating threshold. The processing devices can execute the operations. At least some of the processing devices have a thermal threshold and access to the memory. At least a selected processing device comprises a processing element, a processing unit or a sub-processing unit. If the thermal threshold of the selected processing device is not exceeded, the selected processing device can obtain the first operation from the memory for processing. If the thermal threshold of the selected processing device is exceeded, the selected processing device can obtain the second operation from the memory for processing.

In one example, at least some of the processing devices are processing elements. Preferably, at least some of the processing elements further include at least one sub-processing unit. In this case, the sub-processing units may include a floating point unit, an integer unit and a register associated with the floating point and integer units. More preferably, the sub-processing units further include a local store.

In another example, at least some of the processing elements further comprise a processing unit and a plurality of sub-processing units associated with the processing unit. In this case, the sub-processing units each preferably include a local store.

In a further example, a first one of the processing devices is operable to exchange operations with a second one of the processing devices depending upon the thermal threshold of the first processing device.

In a further example, the selected processing device includes a sub-processing unit and the memory comprises a local store in the sub-processing unit. In this case, the local store may include a first queue for managing the first operation and a second queue for managing the second operation. The first and second operations may be maintained in the memory in a timesharing arrangement.

In another alternative according to aspects of the present invention, there may be a pair of memories. In one example, a first one of the memories includes a first queue for managing a first set of operations having thermal attributes exceeding an operating threshold, and a second one of the memories includes a second queue for managing a second set of operations having thermal attributes not exceeding the operating threshold. If the thermal threshold of the selected processing device is not exceeded, that processing device may obtain at least one of the first set of operations for processing. If the thermal threshold is exceeded, the processing device may obtain at least one of the second set of operations for processing. In another example, there is a pair of memories for storing first and second operations, the first operation having a thermal attribute exceeding an operating threshold and the second operation having a thermal attribute not exceeding the operating threshold. If the thermal threshold of a selected processing device is not exceeded, that processing device may obtain the first operation from either the first or second memory for processing. If the thermal threshold is exceeded, the processing device may obtain the second operation from either the first or second memory for processing.

In accordance with aspects of the present invention, a method of processing tasks is provided. The method includes selected one of a plurality of tasks for execution by a component based on an attribute. The attribute for each task is related to the temperature of the component after execution of the associated task. The selected task is then executed.

Preferably, the attribute is related to the expected increase or decrease in temperature of the component after execution of the associated task. The expected increase or decrease is based on the power density of the component. The tasks may be stored in at least one queue in memory. Alternatively, the tasks may be stored in at least two queues in memory. One queue stores tasks whose attributes meet a condition. Another queue stores tasks whose attributes do not meet the condition. The condition may be that the attribute exceeds a threshold. The task may also be selected based on the current temperature of the component. The tasks may be stored in different addresses in memory prior to execution. The tasks may also be stored in the same address at different times in memory prior to execution. Preferably, the component is a processor.

In accordance with other aspects of the present invention, a system for processing tasks is provided, including a memory for storing tasks to be processed and a component that processes the tasks stored in the memory. The tasks are associated with attributes. The attribute for each task is related to the temperature of the component after processing the associated task. One of the tasks is chosen for processing by the component based on the attribute.

The attribute is preferably related to an expected increase or decrease in temperature of the component after processing of the chosen task. The expected increase or decrease may be based on the power density of the component. The tasks may be stored in at least one queue in memory. The tasks may also be stored in at least two queues in memory. In this case, one queue stores tasks whose attributes meet a condition and another queue stores tasks whose attributes do not meet the condition. The condition may be that the attribute exceeds a threshold.

The memory preferably comprises two separate collections of memory. One collection of memory stores tasks whose attributes meet a condition and the other collection of memory stores tasks whose attributes do not meet the condition. The two separate collections of memory may be stored in the same memory address at different time periods. The two separate collections of memory may be at different memory addresses. In this case, the two separate collections of memory may be in the same semiconductive device, or may be in different semiconductive devices.

Preferably, the component includes a temperature sensor. In this case, the task can be selected based on an output of the temperature sensor. The system may also comprise a second component capable of processing the tasks. One or more of the tasks can be selected for each component based on an expected temperature of each component after processing the task. The system may also include a scheduler that selects one or more of the tasks for the component.

BRIEF DESCRIPTION OF THE DRAWINGS

FIG. 4 is a diagram illustrating an exemplary structure of a sub-processing unit (SPU) in accordance with aspects of the present invention.

FIG. 5 is a diagram illustrating multi-queue scheduling in accordance with aspects of the present invention.

DETAILED DESCRIPTION

Figure 1:
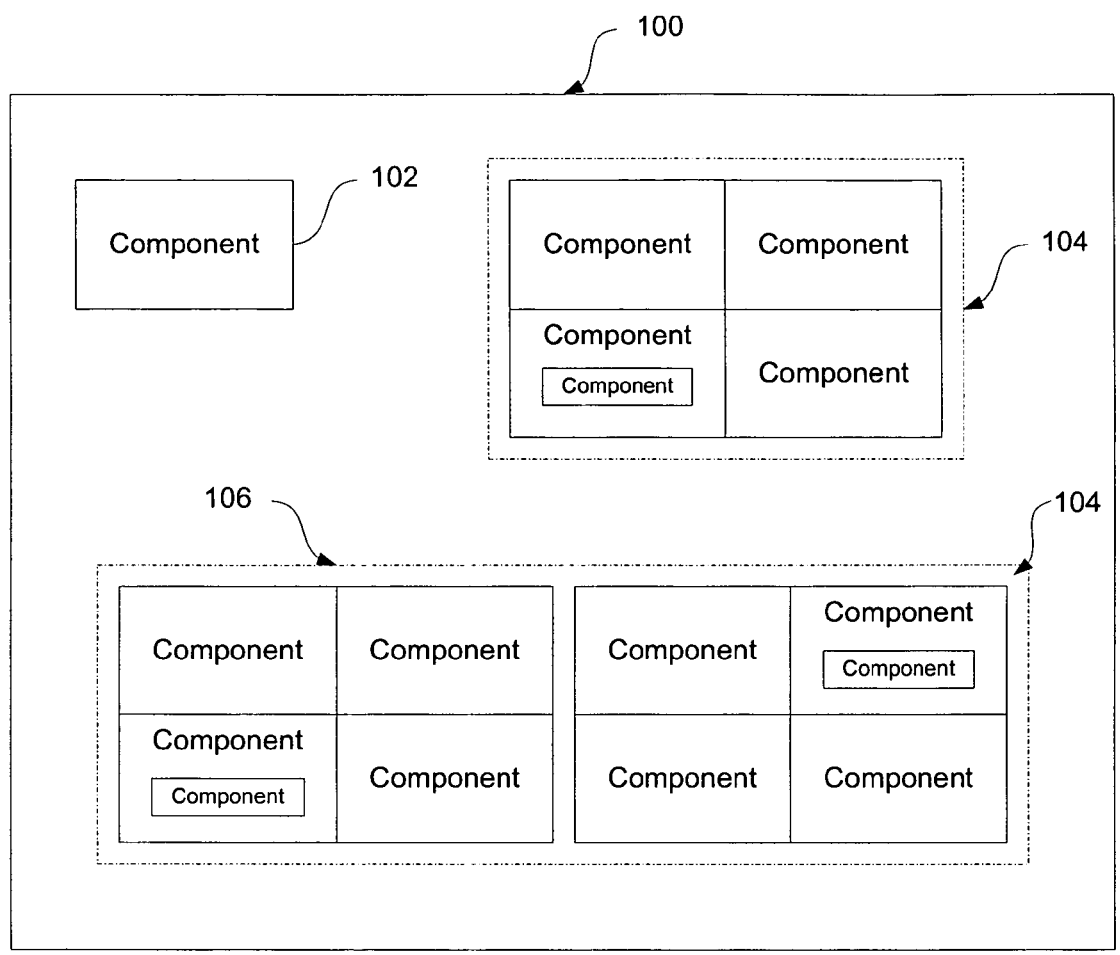
FIG. 1 illustrates components grouped in various combinations in accordance with aspects of the present invention.

In describing the preferred embodiments of the invention illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

Figure 3A:
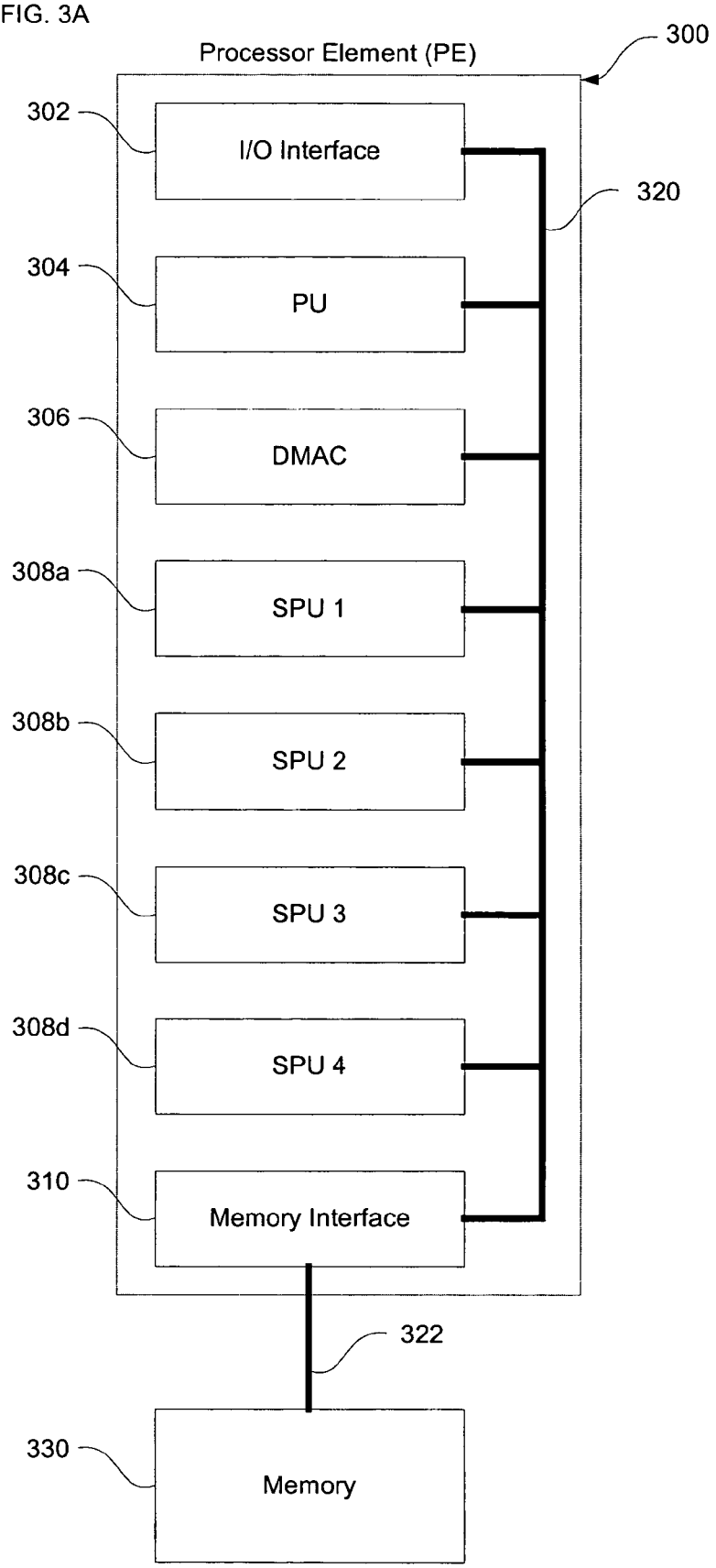
FIG. 3A is a diagram illustrating an exemplary structure of a processing element (PE) in accordance with aspects of the present invention.

Reference is now made to FIG. 3A, which is a block diagram of a basic processing module or processor element (PE) 300 that can be employed in accordance with aspects of the present invention. As shown in this figure, the PE 300 preferably comprises an I/O interface 302, a processing unit (PU) 304, a direct memory access controller (DMAC) 306, and a plurality of sub-processing units (SPUs) 308, namely SPUs 308a-308d. While four SPUs 308a-d are shown, the PE 300 may include any number of such devices. A local (or internal) PE bus 320 transmits data and applications among PU 304, the SPUs 308, I/O interface 302, DMAC 306 and a memory interface 310. Local PE bus 320 can have, e.g., a conventional architecture or can be implemented as a packet switch network. Implementation as a packet switch network, while requiring more hardware, increases available bandwidth.

PE 300 can be constructed using various methods for implementing digital logic. PE 300 preferably is constructed, however, as a single integrated circuit employing CMOS on a silicon substrate. PE 300 is closely associated with a memory 330 through a high bandwidth memory connection 322. The memory 330 desirably functions as the main memory for PE 300. Although the memory 330 is preferably a dynamic random access memory (DRAM), the memory 330 could be implemented using other means, e.g., as a static random access memory (SRAM), a magnetic random access memory (MRAM), an optical memory, a holographic memory, etc. DMAC 306 and memory interface 310 facilitate the transfer of data between the memory 330 and the SPUs 308 and PU 304 of the PE 300.

PU 304 can be, e.g., a standard processor capable of stand-alone processing of data and applications. In operation, the PU 304 schedules and orchestrates the processing of data and applications by the SPUs 308. The SPUs 308 preferably are single instruction, multiple data (SIMD) processors. Under the control of PU 304, the SPUs 308 may perform the processing of the data and applications in a parallel and independent manner. DMAC 306 controls accesses by PU 304 and the SPUs 308 to the data and applications stored in the shared memory 330. Preferably, a number of PEs, such as PE 300, may be joined or packed together, or otherwise logically associated with one another, to provide enhanced processing power.

Figure 3B:
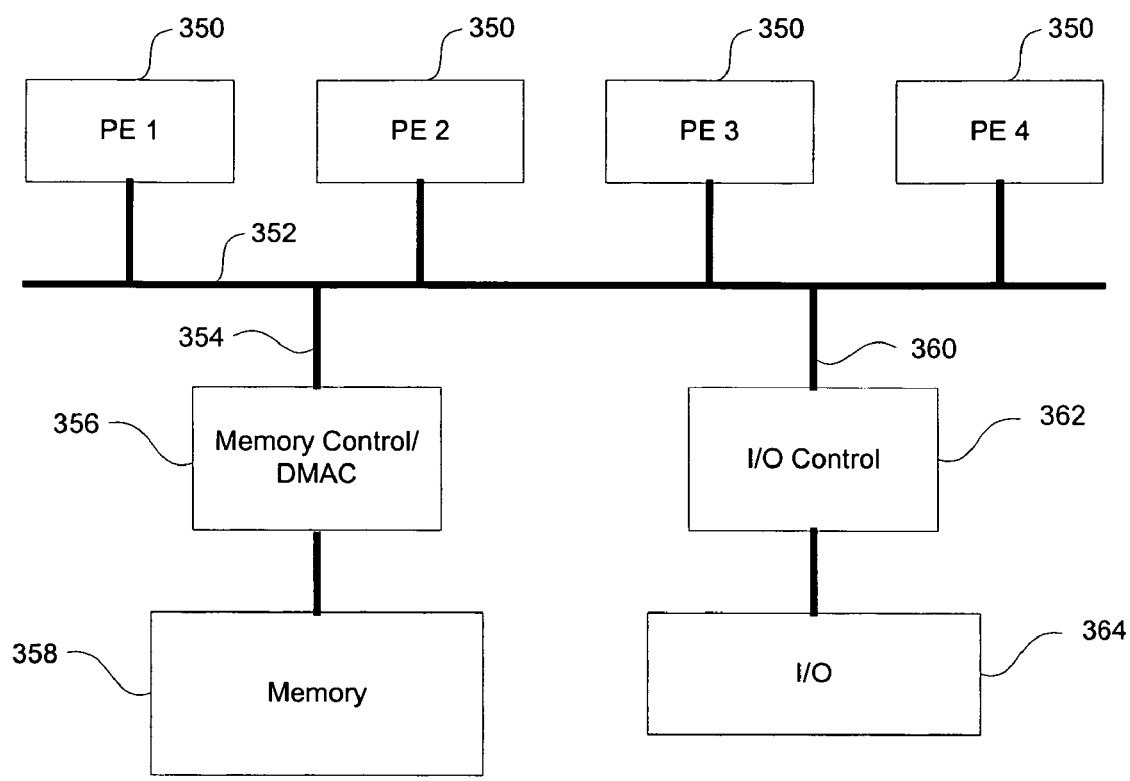
FIG. 3B is a diagram illustrating an exemplary structure of a multiprocessing system of PEs in accordance with aspects of the present invention.

FIG. 3B illustrates a processing architecture comprised of multiple PEs 350 (PE 1, PE 2, PE 3, and PE 4) that can be operated in accordance with aspects of the present invention. Preferably, the PEs 350 are on a single chip. The PEs 350 may or may not include the subsystems such as the PU and/or SPUs discussed above with regard to the PE 300 of FIG. 3A. The PEs 350 may be of the same or different types, depending upon the types of processing required. For example, the PEs 350 may be generic microprocessors, digital signal processors, graphics processors, etc.

The PEs 350 are preferably tied to a shared bus 352. A memory controller or DMAC 356 may be connected to the shared bus 352 through a memory bus 354. The DMAC 356 connects to a memory 358, which may be of one of the types discussed above with regard to memory 330. An I/O controller 362 may also be connected to the shared bus 352 through an I/O bus 360. The I/O controller 362 may connect to one or more I/O devices 364, such as frame buffers, disk drives, etc. It should be understood that the above processing modules and architectures are merely exemplary, and the various aspects of the present invention may be employed with other structures, including, but not limited to multiprocessor systems of the types disclosed in U.S. Pat. No. 6,526,491, entitled "Memory Protection System and Method for Computer Architecture for Broadband Networks," issued on Feb. 25, 2003, and U.S. application Ser. No. 09/816,004, entitled "Computer Architecture and Software Cells for Broadband Networks," filed on Mar. 22, 2001, which are hereby expressly incorporated by reference herein.

FIG. 4 illustrates the structure and function of an SPU 400 that can be employed in accordance with aspects of the present invention. SPU 400 preferably includes local store 402, registers 404, one or more floating point units 406 and one or more integer units 408. The components of SPU 400 are, in turn, comprised of subcomponents, as will be described below. Depending upon the processing power required, a greater or lesser number of floating point units (FPUs) 406 and integer units (IUs) 408 may be employed. In a preferred embodiment, local store 402 contains at least 128 kilobytes of storage, and the capacity of registers 404 is 128×128 bits. Floating point units 406 preferably operate at a speed of at least 32 billion floating point operations per second (32 GFLOPS), and integer units 408 preferably operate at a speed of at least 32 billion operations per second (32 GOPS).

Local store 402 is preferably not a cache memory. Cache coherency support for the SPU 400 is unnecessary. Instead, the local store 402 is preferably constructed as an SRAM. A PU 204 may require cache coherency support for direct memory access initiated by the PU 204. Cache coherency support is not required, however, for direct memory access initiated by the SPU 400 or for accesses to and from external devices.

SPU 400 further includes bus 410 for transmitting applications and data to and from the SPU 400 through a bus interface (Bus I/F) 412. In a preferred embodiment, bus 410 is 1,024 bits wide. SPU 400 further includes internal busses 414, 416 and 418. In a preferred embodiment, bus 414 has a width of 256 bits and provides communication between local store 402 and registers 404. Busses 416 and 418 provide communications between, respectively, registers 404 and floating point units 406, and registers 404 and integer units 408. In a preferred embodiment, the width of busses 416 and 418 from registers 404 to the floating point or integer units is 384 bits, and the width of the busses 416 and 418 from the floating point or integer units to the registers 404 is 128 bits. The larger width of the busses from the registers 404 to the floating point units 406 and the integer units 408 accommodates the larger data flow from the registers 404 during processing. In one example, a maximum of three words are needed for each calculation. The result of each calculation, however, is normally only one word.

Reference is now made to FIG. 1, which illustrates components 102 formed on or in a substrate 100. The substrate 100 and the components 102 may comprise part or all of a computer chip. The components 102 may be logic devices or other circuitry. One or more components 102 in an area of the substrate 100 may be associated together as a unit 104. Units 104 and groups 106 of units 104 may also be associated with one another to form, e.g., PEs 300, PUs 304, SPUs 308, PEs 350 or subcomponents thereof. For example, a group of units 106 may comprise an SPU 400 and units 104 within the group 106 may comprise local store 402, registers 404, FPU 406, Integer Unit 408 and Bus I/F 412. Each unit 104, in turn, may include other units 104 and components 102 as well, such as DRAM memory cells, logic gates, buffers, etc. While components 102, units 104 and groups 106 have been used to illustrate various levels of complexity, the term "component" is also used more generally to refer to devices at all levels, from the most basic building blocks (e.g., transistor and capacitors) up to the PE 300 or the PE 350 and the entire computer chip itself. Typically, the components are constructed as integrated circuits employing a complementary metal oxide semiconductor (CMOS) on the substrate 100. The substrate 100 is preferably a silicon substrate. Alternative materials for the substrate 100 include, but are not limited to, gallium arsenide, gallium aluminum arsenide and other so-called III-B compounds employing a wide variety of dopants. Components 102 could also be implemented using superconducting material, e.g., rapid single-flux-quantum (RSFQ) logic.

As the components perform operations such as processing instructions or tasks (e.g., a series of instructions), they often generate heat. As used herein, the terms "operation" or "tasks" relate to activities to be performed, and include, but are not limited to, instructions, tasks and programs of single or multiple steps.

In one aspect of the invention, operations to be performed by a component may be associated with a thermal attribute such that the thermal attribute's value is related to the amount of heat that is expected to be generated by that component when it performs that operation. Preferably, the thermal attribute is also based in time. For example, the value of the attribute may represent the amount of heat generated over a fixed period of time.

The thermal attribute may be either measured or estimated. For example, a thermometer or other temperature sensing device may be used to actually measure the temperature of the unit as it performs a particular operation.

The thermal attribute is preferably estimated based on the power consumption of the components. For example, some components may require more power to operate and have a higher thermal attribute. Other components may have the same power consumption but are more densely packed together, which would tend to generate more heat than components that are spaced well apart. In this regard, the thermal attribute may be estimated based on both factors, in which case the thermal attribute is based on the power density of the component or groups of components. Thus, in some cases, the thermal attribute may reflect the heat expected to be generated as the component executes an operation, the amount of heat generated over a period of time, the general power consumption of a component, the power density of a component, and the power density of related (e.g., physically or logically related) groups of components. In order to achieve effective thermal management of the chip, it may be desirable to schedule power consumption for each component. Component power consumption may be estimated during chip development. For example, circuit simulation of the chip, subsystems and/or individual components may be performed.

Preferably, the thermal attributes are further associated with specific components. For example, if an operation—such as an integer add operation—involves only integer unit 408, then the thermal attribute can be specifically associated with integer unit 408. Similarly, the thermal attribute of a floating point operation may be specifically associated with floating point unit 406. Other operations may involve a set of components, such as moving data from local store 402 to register 404. Still other operations may involve all of the components or may be difficult to attribute to any one particular set of components. For example, rendering a 3-D figure may involve all of the components in SPU 400, in which case the thermal attribute is applied to all of the components in SPU 400. Alternatively, it may be difficult to predict how much heat will be generated by individual components when performing an operation, in which case a thermal attribute for the operation can be generally assigned to a group of components. The table below illustrates a sample set of operations, components and thermal attributes.

| Operation | Thermal Attribute | Component(s) |
| --- | --- | --- |
| 3-D Rendering | 12 | SPU 400 |
| Integer Add | 3 | IU 408 |
| Floating Point Add | 7 | FPU 406 |
| Memory Move | 2 | Store 402, Registers 404 |

In a preferred example, the thermal attribute for a given component (or set of components) may be calculated as follows:

$$TA = k*(P/S)$$

TA, the thermal attribute, is equal to the power density, or power consumption (P) of a component, divided by the size or footprint (S) of the component, multiplied by a factor or constant (k) that is used for thermal estimation.

Figure 11:
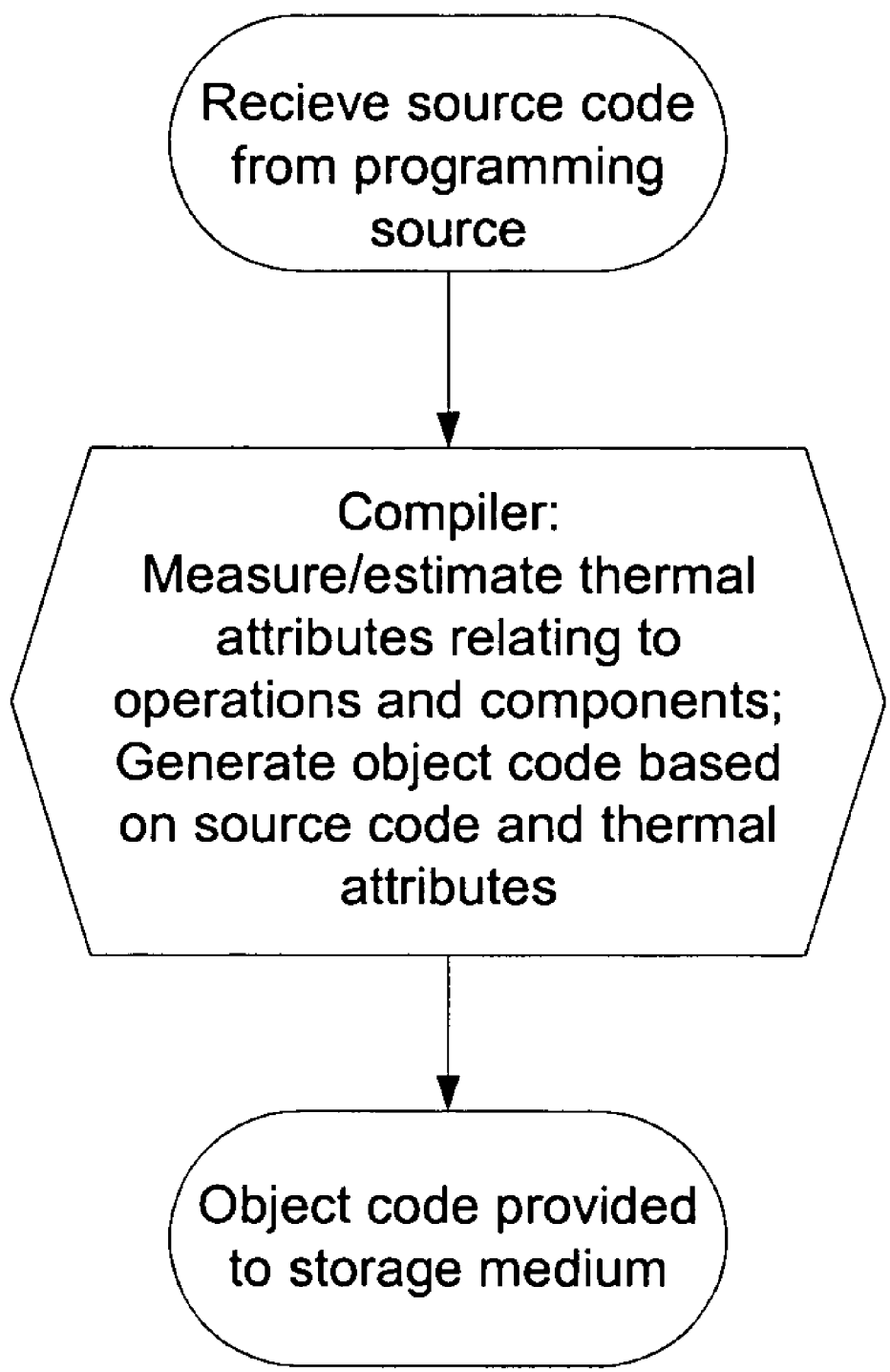
FIG. 11 illustrates compiler functionality in accordance with aspects of the present invention.

In accordance with one aspect of the invention, a program compiler uses the thermal attributes to help prevent a component from overheating. The compiler may be implemented in software, firmware, hardware or a combination of the above. It may be associated with (e.g., incorporated into) a processing element (such as PE 300 or PE 350) or subcomponent thereof. FIG. 11 illustrates compiler functionality in accordance with aspects of the invention. As is well known in the art, compilers receive source code and generate object code that can be run on a computing system. According to aspects of the present invention, the compiler receives source code as well as thermal attributes relating to operations and/or components. The compiler preferably generates object code based on the thermal attributes. As the compiler manages compilation by counting the number of instructions, the thermal attribute(s) of the object code compiled by the compiler is statically estimated. Enhanced thermal attribute determination is preferably made using a "profiler," which is a performance monitor that can count dynamic execution of the instructions and can report the operating frequency of each component. The profiler can provide more accurate thermal estimates to the compiler, which, in turn, will result in thermally optimized object code generation.

Figure 2A:
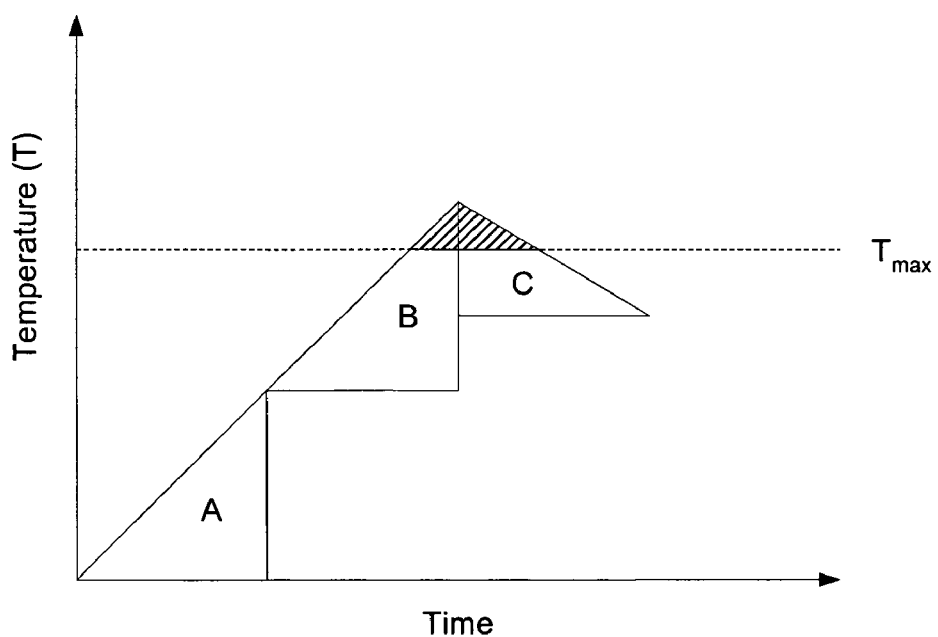
FIGS. 2A-B are graphical illustrations plotting temperature versus time for computing devices.
Figure 2B:
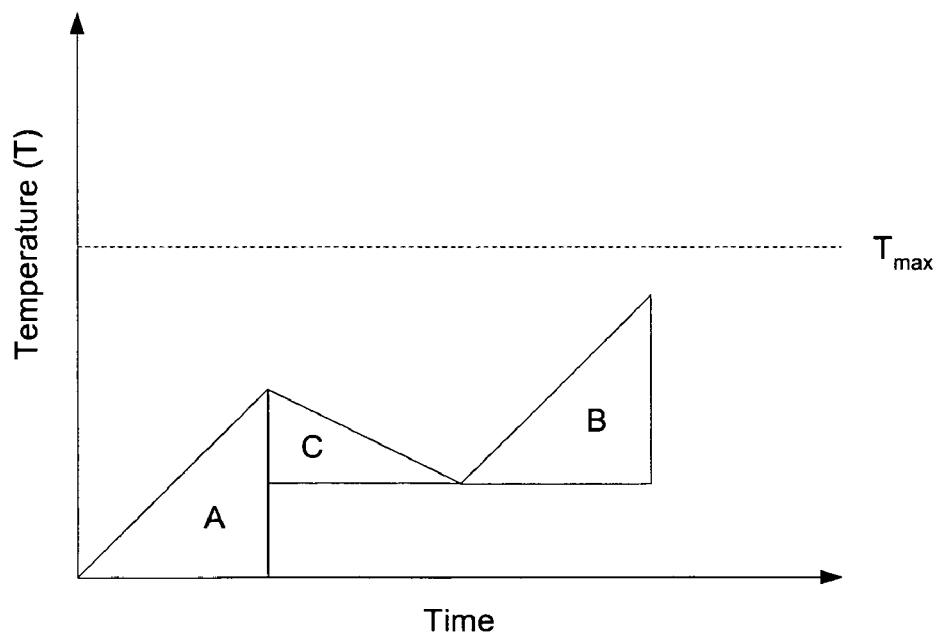

FIGS. 2A-B illustrate how a compiler or other instruction scheduler can manage operations so as to avoid degradation of the processing or damage to the components. For the purpose of illustration, it shall be assumed that the thermal threshold ($T_{max}$) represents a temperature which is undesirable to exceed. The triangular segments A, B and C represent instructions which are performed by a component. For instance, segments A and B represent, e.g., computationally intensive instructions or tasks that generate a significant amount of heat while segment C is, e.g., not as computationally intensive and does not generate as much heat as either A or B. More specifically, assume that tasks A, B and C are parts of the overall calculation (2*3)+(4*5)+(6+7), wherein task A represents (2*3), task B represents (4*5) and task C represents (6+7). As seen in FIG. 2A, when the tasks are performed in the order of A, B and C, the temperature can exceed $T_{max}$. Here, because A and B are performed consecutively, the thermal threshold $T_{max}$ is breached.

It is well known in the art that a compiler often has discretion with respect to how it orders certain instructions. In accordance with a preferred embodiment of the present invention, the compiler may selectively reorder the schedule based on the thermal attributes of the operations. Preferably, the compiler initially determines whether any of the operations A, B or C has a thermal attribute associated with it. If so, the compiler may selectively compile the operations into object code using an order that prevents $T_{max}$ from being exceeded. In the above example, the compiler may change the order in which the equation is calculated without changing the ultimate result. For example, it may schedule the operations in the order of A, C and B. Thus, as seen by FIG. 2B, when the order of the instructions is changed, the temperature does not exceed $T_{max}$.

Note that the thermal threshold $T_{max}$ is not necessarily a failure temperature. Instead, $T_{max}$ may be a design criteria selected, e.g., based on rated operating parameters.

Furthermore, when reordering operations, the compiler preferably keeps track of the components which do the computations. For example, a series of operations may cause one part of SPU 400 to overheat (such as FPU 406) while the other parts of the SPU stays cool (such as FPU 408). The compiler preferably addresses this problem by attempting to schedule operations so that they are evenly distributed among the various components of the SPU. One manner in which the compiler may do this is to track or simulate the temperature of the components as they perform the program's operations by using the thermal attributes. For example, component X may be assumed to cool at the rate of 2 thermal attribute points per clock cycle and have a threshold of 8 thermal attribute points before it overheats. If an operation associated with that component has a thermal attribute of 5 points per cycle, then the component would be assumed to overheat if that operation was performed three times in a row (5−2 points after first cycle results in current thermal index of 3; 5−2 points after second cycle adds another 3 points for a total current thermal index of 6; 5−2 points after second cycle adds another 3 points for a total current thermal index of 9). Having detected that component X may overheat with such scheduling, the compiler would attempt to schedule an operation to be performed by another component while component X remains inactive and cools down.

Alternatively, the compiler may attempt to select a different operation whose thermal attribute is lower than the rate at which the component is expected to cool down. For example, if the compiler determines that component X may overheat with the current schedule of operations, it may attempt to intersperse an operation having a thermal attribute of 1 (which would allow the component to cool somewhat given that it cools at the rate of 2 thermal attributes a cycle) in between the operations having a thermal attribute of 5.

Figure 10A:
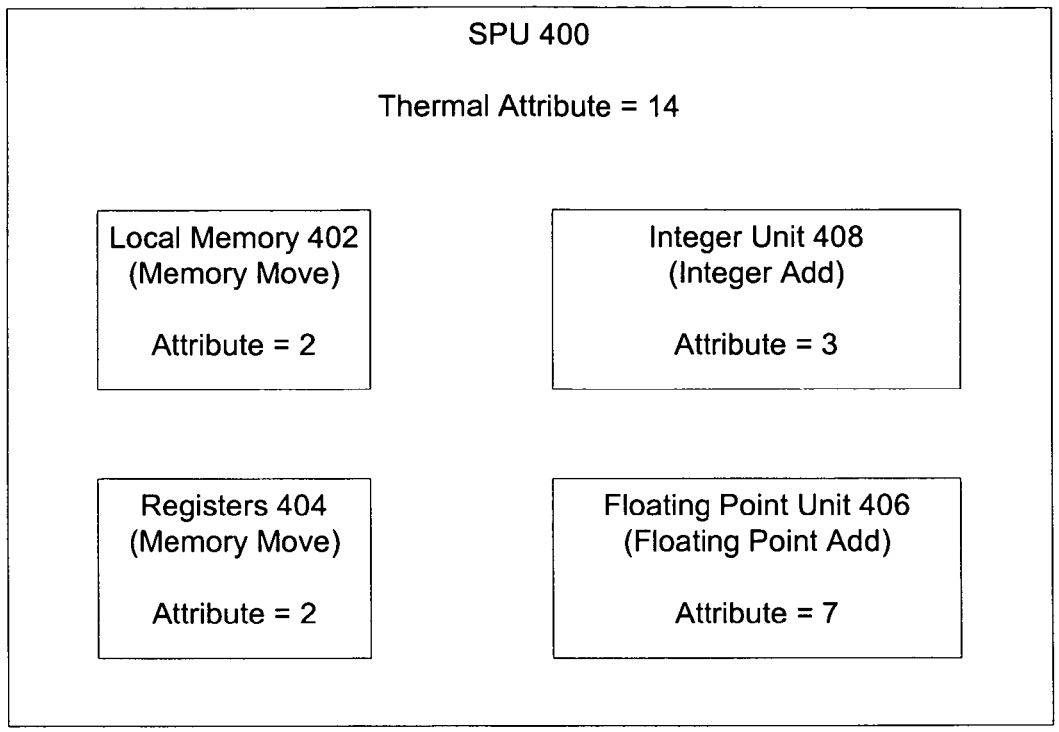
FIGS. 10A-B illustrate components and thermal values associated with the components according to aspects of the present invention.
Figure 10B:
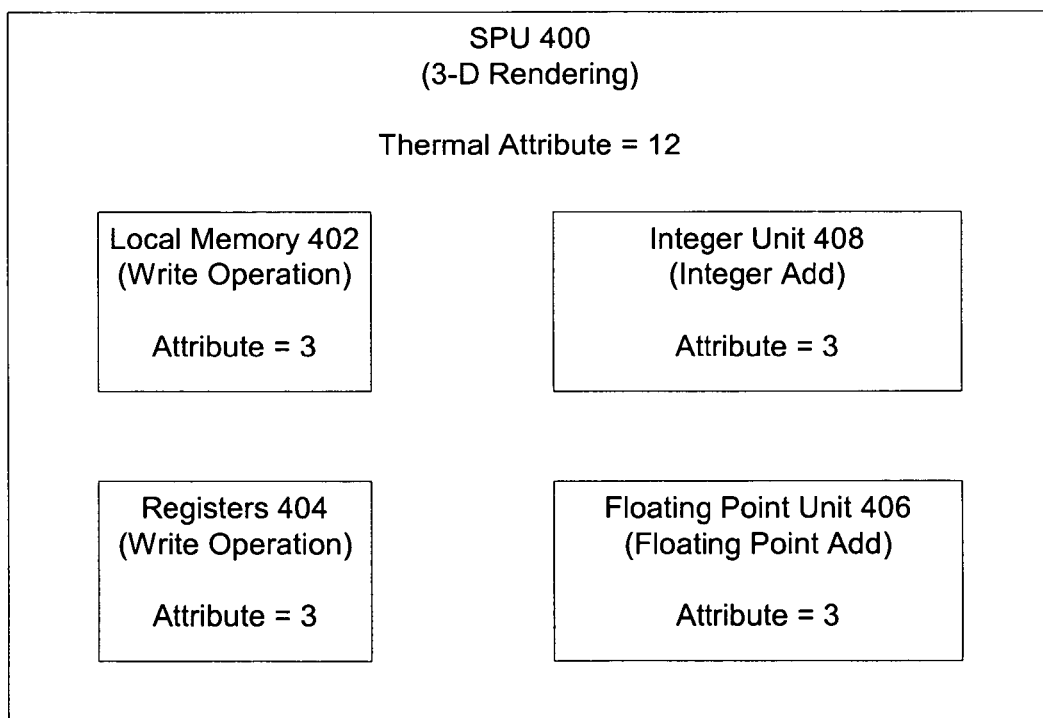

To the extent components are contained by other components, the compiler may further allocate the thermal attribute of a larger component to its subcomponents, or from a subcomponent to its parent component. For example, as shown in FIG. 10A, if the individual components are simultaneously performing operations having thermal attributes of 2, 3, 2, and 7, the thermal attribute for the SPU for all of those operations may be considered to be 14. On the other hand, a thermal attribute that is attributable to an entire SPU 400 may be allocated to individual components. As shown in FIG. 10B, if the thermal attribute of 3-D rendering is 12 and attributable to the entire SPU, that value may be evenly allocated to components within the SPU 400. Other variations in allocation are possible, including allocations between and among components that are related by a container relationship, logical functions and physical proximity.

It can be seen that the heat values of various components reflect not only the instant operations of individual components, but may also be cumulative over time and may be aggregated for sets of components. Taking these factors into account, the compiler can effectively schedule operations to avoid the thermal threshold $T_{max}$.

Preferably, a cooling attribute is associated with the computer chip containing the various components. The cooling attribute depends on the specific features of the cooling system of the computer chip. For example, the cooling attribute preferably depends on the chip packaging and cooler (such as a heat sink or a fan), if any. If the cooling system has only one state for the cooler (e.g., always operating the fan at a set rotation speed), the cooling attribute will be fixed. If the state of the cooling system can be altered, such as by changing the rotation speed of the fan, the cooling attribute is preferably dynamic, and may be determined or updated when the cooling system changes the operating state of the cooler. In one embodiment, the compiler uses a fixed cooling attribute calculated based upon a typical operational state of the cooler. The compiler uses the cooling attribute when calculating the density of operations belonging to specific components. More preferably, the compiler also factors in the heat dissipation capabilities of the chip packaging. In a further embodiment, the compiler or the profiler employs a dynamic cooling attribute to help the compiler perform object code generation. The table below illustrates an exemplary schedule for an integer operation that will be processed by a given integer unit (IU) 408 and a given local store (LS) 402 based upon thermal and cooling attributes.

| Instruction # | Instruction Processed By | IU | LS |
|---|---|---|---|
| 1 | LS | 0 | 2 |
| 2 | IU | 3 | 1 |
| 3 | LS | 2 | 3 |
| 4 | IU | 5 | 2 |
| 5 | nop | 4 | 1 |
| 6 | IU | 7 | 0 |
| 7 | IU | 10 | 0 |
| 8 | Other | 9 | 0 |
| 9 | nop | 8 | 0 |
| 10 | nop | 7 | 0 |
| . | . | . | . |
| . | . | . | . |
| . | . | . | . |

For the above set of instructions, assume that the thermal attribute of the IU 408 is 3, the cooling attribute of the chip is 1, and the thermal threshold of the IU 408 is 10. The leftmost column identifies the instruction number, the second column identifies which component handles that instruction, and the two columns on the right of the table show the heat generated or the temperature of the component after handling the instruction. For example, instruction 1 is processed or implemented by the LS, resulting in a heat value of 2, while the IU remains at zero. Instruction 2 is operated on by the IU, after which the IU has a heat value of 3, and the LS has cooled off to a heat value of 1. The processing continues until instruction 5, which is a "no operation" (nop). This permits the IU and LS to cool off to some degree. The IU processes instructions 6 and 7, raising its heat value to the threshold. In order to prevent exceeding the threshold, a different component ("Other") preferably processes the next instruction. For example, the profiler may monitor the execution of the instructions by the IU and LS and report the information to the compiler. The compiler may use this information in conjunction with the thermal attributes and cooling attribute to have instruction 8 processed by another IU.

Reference is now made to FIG. 5, which illustrates a multi-queue scheduling methodology 500 in accordance with aspects of the present invention. As seen in FIG. 5, a scheduler 502 is preferably associated with two queues. For convenience, the first queue is referred to herein as a "hot queue" 504 and the second queue is referred to herein as a "cool queue" 506. The queues 504, 506 may be implemented in many different ways, e.g., as data structures or a continuous or discontinuous collection in memory. In one example employing the SPUs 400, the queues 504, 506 are implemented external to the SPUs 400. The queues 504, 506 may also be implemented external to the PU 304 or the PE 300 (or PE 350), e.g., associated with the memory 330 (or memory 358). In another example, the queues 504, 506 are implemented internal to the SPUs 400. Desirably, the queues 504, 506 may be implemented in association with the local store 402 or the registers 404. For example, the hot queue 504 may be implemented in conjunction with the local store 402 of a first SPU 400 and the cool queue 506 may be implemented in conjunction with the local store 402 of a second SPU 400. In the case where an SPU 400 includes multiple local stores 402, the hot queue 504 may be stored in a first one of the local stores 402 while the cool queue 506 may be stored in a second one of the local stores 402 in the same SPU 400. Alternatively, both the hot queue 504 and the cool queue 506 may be implemented in the same local store 402 or in the same memory external to the SPU 400 or external to the PE 300. If the queues 504, 506 are implemented via the registers 404, various alternatives are possible. In one case, the hot queue 504 may be implemented via the register 404 of a first SPU 400 and the cool queue 506 may be implemented via the register 404 of a second SPU 400. The queues 504, 506 may also be implemented in a timesharing arrangement, for example where one of the queues 504, 506 is stored in a memory for a first period of time and then the other one of the queues 504, 506 is stored in the memory for a second period of time.

The scheduler 502 may populate the hot queue 504 and cool queue 506 with instructions, tasks or other operations, depending upon thermal attributes. Preferably, the scheduler 502 has access to a look-up table containing thermal attributes. The scheduler 502 may operate before and/or during runtime operation. The scheduler 502 may choose a task from the hot queue 504 or the cool queue 506 depending upon the current (or predicted) temperature of a component. In a preferred example, so long as the current temperature of the device does not exceed an operating threshold, the scheduler 502 may select any task from either the hot or cool queues 504, 506. In another preferred example, if the operating threshold is not exceeded and if both hot and cool tasks are available, the scheduler 502 selects tasks from the hot queue 504 before selecting tasks from the cool queue 506. By way of example only, floating point instructions or tasks requiring multiple operations may be associated with a relatively high or positive thermal attribute value. These operations would be placed in the hot queue 504, e.g., as seen by tasks $H_1 \ldots H_N$. Other operations, such as integer instructions and single operation tasks, may be associated with a relatively low or negative thermal attribute. Such operations would be placed in the cool queue 506, e.g., as seen by tasks $C_1 \ldots C_N$. The thermal attribute of a task is preferably determined using information from the compiler and/or profiler, either of which may report the operating frequency of each component performing the task. More preferably, the thermal attribute of the task incorporates the operating frequency (e.g., the frequency of use) of the component(s), the thermal attribute of the component(s), and the cooling attribute. In accordance with one embodiment, a simple scheduler only uses the total thermal attribute of a component that has sub-components, such as the SPU 400. In accordance with another embodiment, an advanced scheduler manages the thermal attributes of sub-components of the SPU such as the LS 402, the FPU 406 and the IU 408. The table below illustrates thermal attributes for an IU, an FPU and an LS in a given SPU for a 3-D task and an MPEG-2 task.

| Task | IU | FPU | LS | Total (SPU) |
|---|---|---|---|---|
| 3-D | 3 | 7 | 2 | 12 |
| MPEG-2 | 2 | 0 | 0 | 2 |

A simple scheduler that only looks at the total thermal attribute for the SPU will see that it has a value of 12, which may exceed the thermal threshold of the SPU. Thus, the simple scheduler may only select the MPEG-2 task for execution by the SPU. In contrast, an advanced scheduler preferably monitors the sub-components of the SPU. In this case, the advanced scheduler may see that no sub-component exceeds its thermal threshold, so the 3-D task may be selected. In an alternative, the schedule may reorder the tasks or the operations within the tasks so that the MPEG-2 task is performed at a certain stage, giving the FPU time to cool off. This flexibility is a powerful tool that enables sub-components, components and/or the entire multiprocessing system to operate without overheating.

As will be apparent to one skilled in the art, the scheduler 502 may be implemented in hardware, firmware, or software. Preferably, the scheduler 502 is hardware-based and implemented in the PU 204. In another preferred alternative, the scheduler 502 is software-based as part of the operations system of the overall computing device. The hot queue 504 and the cool queue 506 are preferably accessible to one or more PEs ($PE_1 \ldots PE_N$), PUs ($PU_1 \ldots PU_N$), and/or SPUs ($SPU_1 \ldots SPU_N$) during a program execution through a bus 508. In accordance with one embodiment, each PE, PU and/or SPU preferably includes thermal sensors (temperature sensing means) to monitor their temperature or, alternatively, estimate the current temperature. In accordance with another embodiment, each PE preferably includes a thermal sensor and an analog to digital A/D converter in order to provide a digital estimation of the temperature. Each kernel on the PE can preferably read its own digitized temperature at any time. The PEs, PUs and SPUs desirably each have a thermal threshold $T_{max}$, which can differ from component to component. If thermal sensors are not available, the current temperature may be calculated by the thermal attribute of the task and the current cooling attribute.

The scheduler 502 may also manage operations without using queues. The operations may be stored in memory and the scheduler 502 may assign some of the operations to processors depending upon the thermal attributes. For example, if there are two operations, the scheduler can assign the two operations to two separate processing elements 300 (or other processing devices) based on the thermal attributes. The operations may be stored in separate memories (or in separate portions of a single memory). The first operation may be stored in a first memory (or first portion of a single memory) and the second operation may be stored in a second memory (or second portion of the single memory). It is not necessary to store the two operations simultaneously; rather, they may be stored in the same or different memory during different time periods (and alternate during fixed or variable continuous or discontinuous periods). Furthermore, it should be understood that the two memories (or two portions of a single memory) are not necessarily dedicated memories limited to specific operations or operations associated with specific thermal attributes. Thus, the first memory (or first portion of the single memory) may store the second operation and the second memory (or second portion of the single memory) may store the first operation. Likewise, it should be understood that the first and second queues 504, 506 may operate in a similar fashion.

Figure 6:
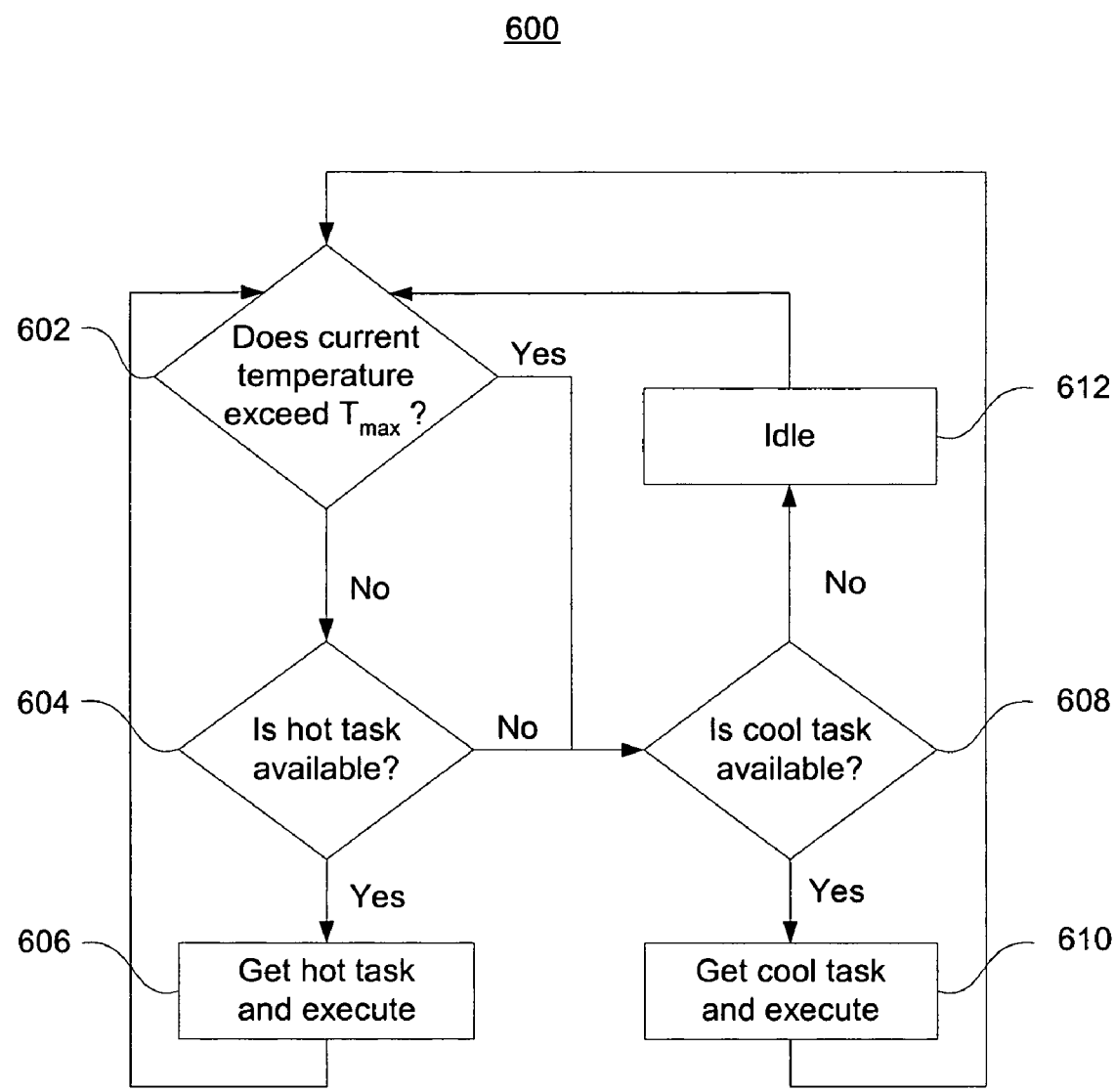
FIG. 6 is a flow diagram illustrating an exemplary dynamic scheduling process according to aspects of the present invention.

FIG. 6 illustrates a flow diagram 600 of a preferred method for obtaining and processing operations. At step 602, the PE, PU or SPU determines whether its current temperature is above the thermal threshold $T_{max}$. If $T_{max}$ is not exceeded, the process next advances to step 604, otherwise the process proceeds to step 608. In step 604, it is determined whether an operation is available from the hot queue 504. If an operation is available, the process advances to step 606, otherwise the process advances to step 608. In step 606, the PE, PU or SPU obtains a "hot" operation and executes it. Upon completion of the operation, the process returns to step 602. In step 608, it is determined whether an operation is available from the cool queue 506. If an operation is available, the process advances to step 610. Otherwise, the process proceeds to step 612. In step 610, the PE, PU or SPU obtains a "cool" operation and executes it. Upon completion of the operation, the process returns to step 602. If no tasks are available for processing, the process may idle or perform a "nop" at step 612 for a period of time (e.g., a predetermined number of cycles) before returning to step 602. Optionally, as discussed above with regard to FIG. 5, if both hot and cool tasks are available and $T_{max}$ is not exceeded, either a hot or a cool task may be selected. Thus, as seen by flow diagram 600, processing devices are able to avoid hot spots and overheating by selecting tasks from the hot and cool queues 504, 506. This process may be performed concurrently by one or more processing devices, thereby permitting execution of instructions and tasks without altering clock speed or shutting down the processing devices.

Figure 7:
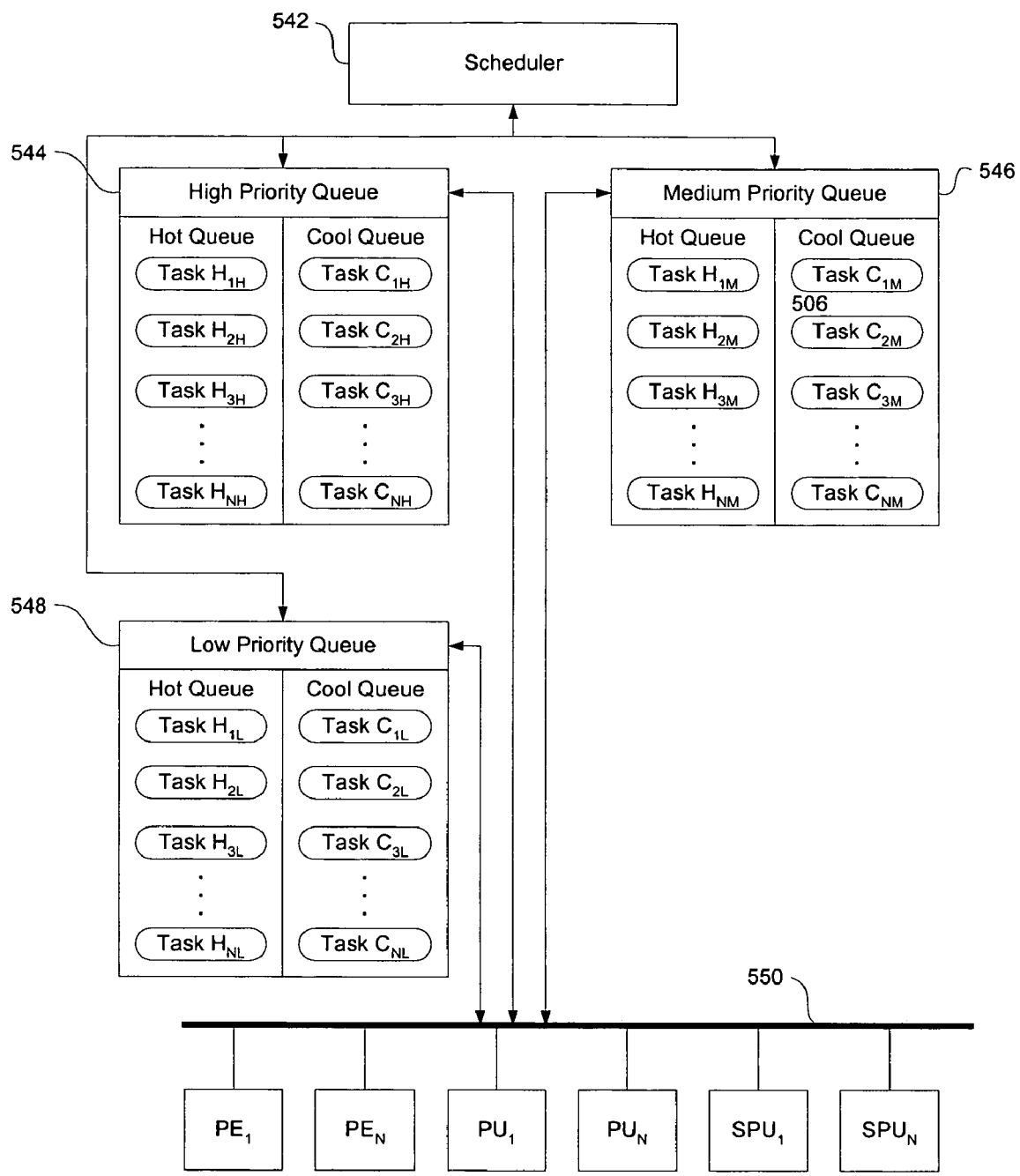
FIG. 7 is a diagram illustrating multi-queue scheduling in accordance with aspects of the present invention.

It is possible to combine the use of hot and cool queues with priority queues, as seen in FIG. 7. In this figure, a multi-queue scheduling methodology 540 is provided. A scheduler 542 is associated with three priority queues, high priority queue 544, medium priority queue 546 and low priority queue 548, although different priority levels and numbers of queues may be employed. The scheduler 542 operates as described above with reference to the scheduler 502. Each of the priority queues 544, 546 and 548 preferably includes a hot queue and a cool queue, which are created and operate in the same manner described above with regard to FIG. 5. For example, the high priority queue 544 has a hot queue for handling tasks $H_{1H} \ldots H_{NH}$ and a cool queue for handling tasks $C_{1H} \ldots C_{NH}$. Similarly, the medium priority queue has a hot queue for handling tasks $H_{1M} \ldots H_{NM}$ and a cool queue for handling tasks $C_{1M} \ldots C_{NM}$. The low priority queue has a hot queue for handling tasks $H_{1L} \ldots H_{NL}$ and a cool queue for handling tasks $C_{1L} \ldots C_{NL}$.

Figure 8:
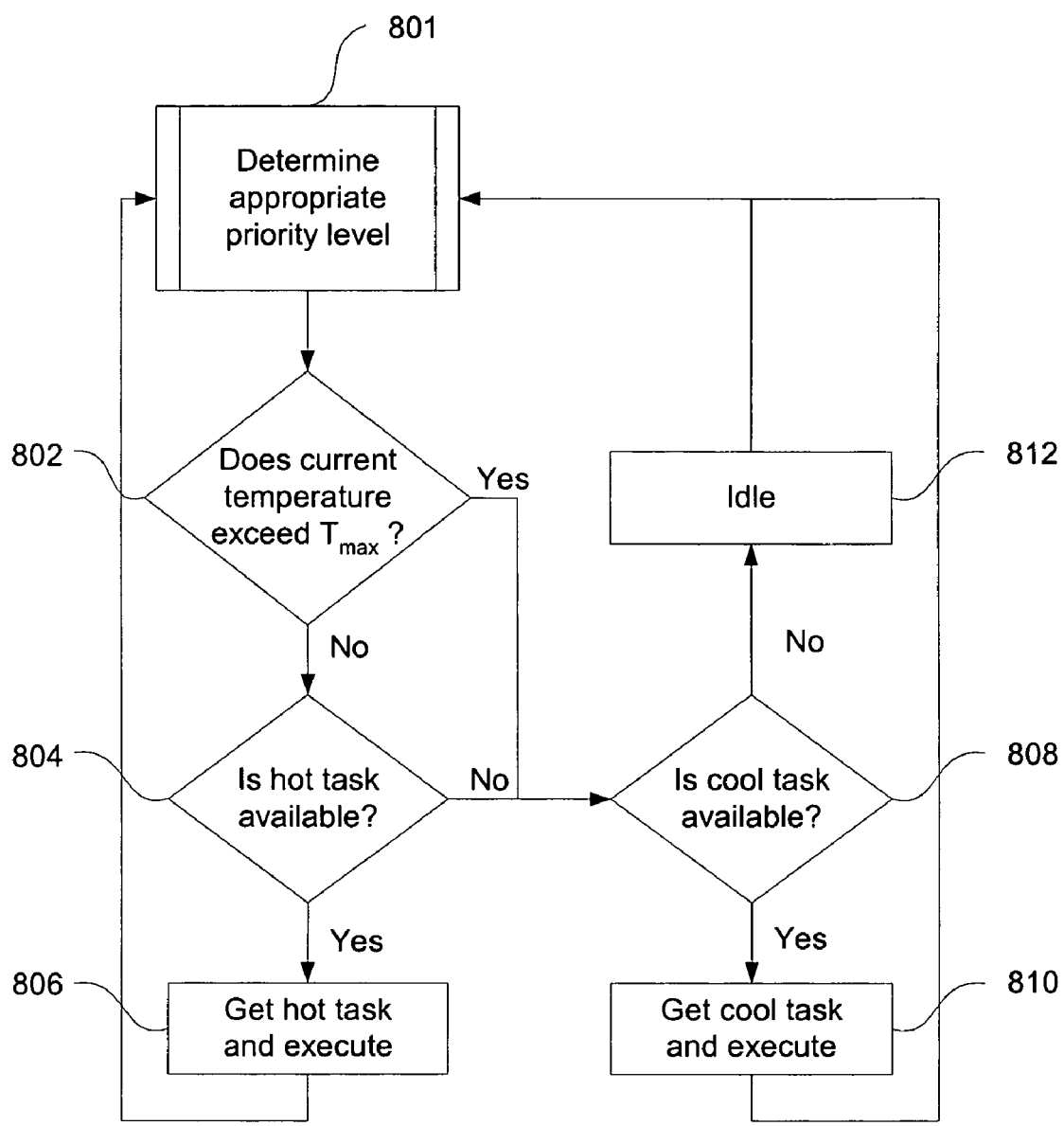
FIG. 8 is a flow diagram illustrating an exemplary dynamic scheduling process according to aspects of the present invention.

FIG. 8 illustrates a flow diagram 800 of a preferred method for obtaining and processing operations when employing priority queues. Initially, in step 801, the PE, PU or SPU determines what priority queue to employ, e.g., high priority queue 544, medium priority queue 546 or low priority queue 548. At step 802, the PE, PU or SPU determines whether its current temperature is above thermal threshold $T_{max}$. If $T_{max}$ is not exceeded, the process next advances to step 804, otherwise the process proceeds to step 808. In step 804, it is determined whether an operation is available from the hot queue 504 of the selected priority queue. If an operation is available, the process advances to step 806, otherwise the process proceeds to step 808. In step 806, the PE, PU or SPU obtains a "hot" operation and executes it. Upon completion of the operation, the process returns to step 801. In step 808, it is determined whether an operation is available from the cool queue 506 of the selected priority queue. If an operation is available, the process advances to step 810, otherwise the process proceeds to step 812. In step 810, the PE, PU or SPU obtains a "cool" operation and executes it. Upon completion of the operation, the process returns to step 801. If no tasks are available for processing, the process idles at step 812 before returning to step 801. Optionally, if both hot and cool tasks are available for a given priority level and $T_{max}$ is not exceeded, either a hot or a cool task may be selected for that priority level. Thus, as seen by the flow diagram 800, processing components are able to avoid hot spots and overheating by selecting tasks during runtime from the hot and cool queues of the various priority queues 544, 546 and 548. This process may be performed concurrently by one or more processing components, thereby permitting execution of instructions and tasks without altering clock speed or shutting down the processing components. In an alternative, if the processing device gets too hot and nears or exceeds $T_{max}$, it can select operations from a lower priority queue (e.g., medium priority queue 546 or low priority queue 548) and/or execute operations at a reduced clock cycle notwithstanding the operations' thermal attributes. Such lower priority tasks may be performed at a reduced clock cycle.

In some situations, a component may be below the thermal threshold $T_{max}$ prior to executing an operation (e.g., a task), but may then exceed $T_{max}$ during task execution. In the past, such an occurrence would likely necessitate shutting down the component and allowing it to cool off. However, a technique has been developed which addresses this problem, and which is particularly suitable for multiprocessor environments.

Figure 9A:
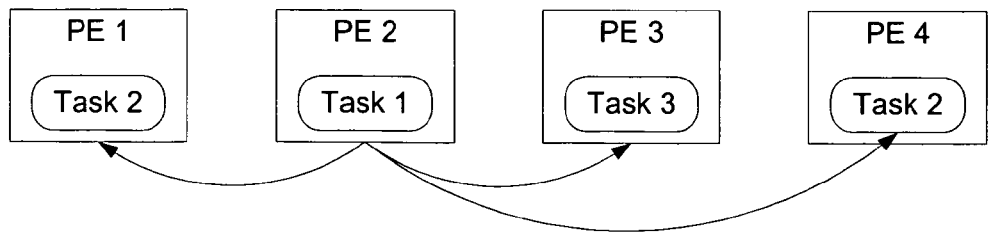
FIGS. 9A-C are diagrams illustrating task migration according to aspects of the present invention.

FIG. 9A illustrates multiple PEs running a group of tasks. In this example, assume PE 2 overheats during its processing of task 1. It is possible to move task 1 from PE 2 to one of the other processors, which may be operating other tasks, e.g., tasks 2 and 3. The other tasks are preferably lower priority tasks then the one currently being performed by PE 2.

Figure 9B:
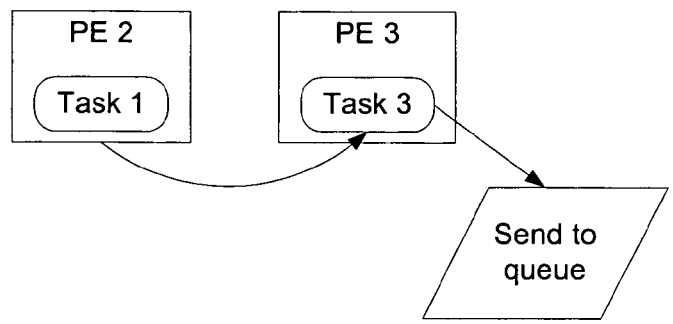
Figure 9C:
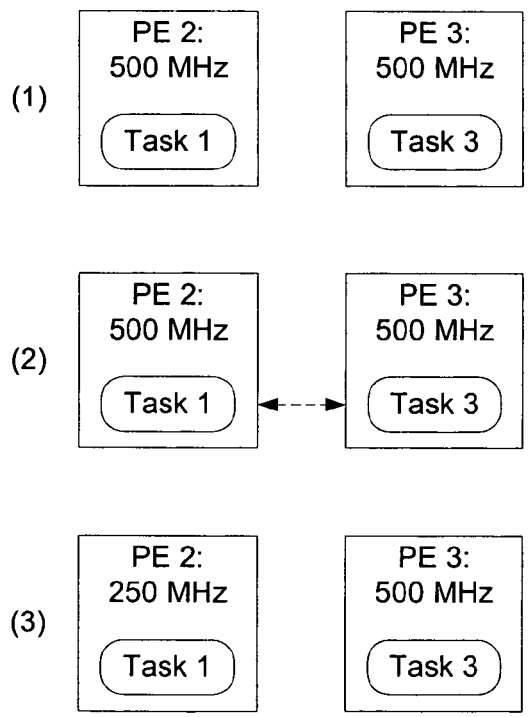

As seen in FIG. 9B, the task in the other processor, e.g., task 3, may be "swapped out" and sent to, e.g., the appropriate queue (or to a different processor). Thus, PE 2 would not perform a task while PE 3 completes task 1. Alternatively, the two processors can swap tasks so that PE 2 performs the lower priority task as seen in FIG. 9C. As seen in FIG. 9C, (1) initially PE 2 and PE 3 may operate at standard clock speed of, e.g., 500 MHz. Then, (2) if PE 2 becomes hot while operating a high priority task 1, its task may be switched with lower priority task 3 of PE 3. Finally, (3) the lower priority task 3 may be performed at a slower or reduced clock speed (e.g., 250 MHz), allowing PE 2 to cool off, while PE 3 continues execution of task 1 at the standard clock speed of 500 MHz. It is also possible to increase the clock speed (e.g., to 650 MHz) to perform a higher priority task. It should be understood that the standard, increased and reduced clock speeds are merely exemplary, and may vary depending upon the specific architecture of the processor, sub-processor and/or maximum clock rate of the multiprocessing system. In a worst-case scenario, the overheating processor may halt operations until the temperature reaches a satisfactory level. However, the other processors in the multiprocessor system will continue processing so that real time operations and other critical operations are performed promptly. While PEs are shown in FIGS. 9A-C, it is possible to perform the same operations with PUs and SPUs, or combinations of various processing devices. For example, an overheating SPU 308 may send its high priority task to the PU 304, which can reassign the task to a second SPU 308. Similarly, the PU 304 may take the lower priority task of the second SPU 308 and assign it to the first SPU 308. Once the first SPU 308 cools down, it may resume processing high priority and/or "hot" tasks at the normal clock speed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A processing system comprising:
   a computing device including a component;
   a plurality of operations to be performed by the component, at least some of the operations including a priority;
   at least one thermal attribute associated with the component and a selected one of the operations, the thermal attribute being indicative of a change in temperature of the component after performance of the selected operation;
   a plurality of priority queues, each priority queue including a first queue and a second queue, the first queue for storing a first set of the operations and the second queue for storing a second set of the operations; and
   a scheduler operable to assign at least one of the operations to the component depending on the thermal attribute.

2. The processing system of claim 1, wherein the scheduler is operable to retrieve a chosen one of the operations from a storage location depending upon the thermal attribute.

3. The processing system of claim 1, wherein the component includes a plurality of sub-components, the scheduler is a simple scheduler, and the thermal attribute is a total thermal attribute associated with the component and not associated with the plurality of sub-components.

4. The processing system of claim 1, wherein the component includes a plurality of sub-components, the scheduler is an advanced scheduler, and the thermal attribute is further associated with at least some of the sub-components.

5. The processing system of claim 1, wherein the component is a processing device and the scheduler is integrated with the processing device.

6. The processing system of claim 1, wherein the selected operation comprises a task, and the thermal attribute is a task thermal attribute.

7. The processing system of claim 6, wherein the task thermal attribute is based on at least one of an operating frequency of the component, a thermal attribute of the component, and a cooling attribute.

8. The processing system of claim 1, further comprising a scheduler operable to assign at least some of the operations to either the first or the second queue in a selected one of the priority queues based on the priorities of the operations and on the thermal attribute.

9. The processing system of claim 8, wherein the scheduler is further operable to retrieve a chosen one of the operations from the first queue or the second queue of the selected priority queue depending upon the thermal attribute and the priority of the chosen operation.

* * * * *